US012759523B2

(12) United States Patent
Boo et al.

(10) Patent No.: US 12,759,523 B2
(45) Date of Patent: Oct. 13, 2026

(54) BRAKE DEVICE AND VEHICLE EQUIPPED WITH BRAKE DEVICE

(71) Applicant: HYUNDAI MOBIS CO., LTD., Seoul (KR)

(72) Inventors: Sang Pil Boo, Suwon-si (KR); Yeon Jun Lee, Hwaseong-si (KR); Choong Sik Shin, Suwon-si (KR); Il Ho Park, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 425 days.

(21) Appl. No.: 18/303,637

(22) Filed: Apr. 20, 2023

(65) Prior Publication Data

US 2024/0051509 A1 Feb. 15, 2024

(30) Foreign Application Priority Data

Aug. 12, 2022 (KR) ........................ 10-2022-0101097

(51) Int. Cl.

| | |
|---|---|
| ***B60T 13/74*** | (2006.01) |
| ***B60T 1/06*** | (2006.01) |
| ***F16D 55/228*** | (2006.01) |
| ***F16D 65/18*** | (2006.01) |
| *F16D 121/04* | (2012.01) |
| *F16D 121/24* | (2012.01) |
| *F16D 125/40* | (2012.01) |
| *F16D 125/48* | (2012.01) |

(52) U.S. Cl.

CPC ............ *B60T 13/745* (2013.01); *B60T 1/065* (2013.01); *F16D 55/228* (2013.01); *F16D 65/183* (2013.01); *F16D 2121/04* (2013.01); *F16D 2121/24* (2013.01); *F16D 2125/40* (2013.01); *F16D 2125/48* (2013.01)

(58) Field of Classification Search

CPC .. B60T 13/741; B60T 13/746; F16D 2121/24; F16D 2121/04; F16D 2125/40; F16D 55/228

See application file for complete search history.

(56) References Cited

U.S. PATENT DOCUMENTS 5,348,123 A * 9/1994 Takahashi ............ B60T 13/745 188/162
6,837,342 B1 * 1/2005 Olschewski .......... F16D 55/228 188/72.8
9,834,190 B2 * 12/2017 Kim ...................... B60T 13/686
(Continued)

FOREIGN PATENT DOCUMENTS

JP 2009-190425 A 8/2009
KR 10-2002-0059728 A 7/2002

OTHER PUBLICATIONS

Office Action issued in the corresponding Korean Patent Application. No. 10-2022-0101097 dated Apr. 22, 2026.

*Primary Examiner* — Nicholas J Lane
(74) *Attorney, Agent, or Firm* — NovoTechIP International PLLC

(57) ABSTRACT

A structure of a brake system that pressurizes a brake pad as brake fluid in a master cylinder uniformly drives a plurality of caliper pistons by a master piston driven by receiving power of a braking motor of the present disclosure may be simplified, and an opposed type brake system that simultaneously drives a pair of brake pads may be implemented.

11 Claims, 13 Drawing Sheets

(56) References Cited

U.S. PATENT DOCUMENTS

| | | | | |
|---|---|---|---|---|
| 2004/0216967 | A1* | 11/2004 | Veneziano | F16D 55/228 188/72.5 |
| 2009/0199555 | A1* | 8/2009 | Hatano | B60T 13/686 60/545 |
| 2017/0045105 | A1* | 2/2017 | Hofmeister | F16D 65/18 |
| 2018/0079400 | A1* | 3/2018 | Crossman | B60T 15/028 |
| 2019/0118901 | A1* | 4/2019 | Nago | B62L 3/02 |
| 2024/0052899 | A1* | 2/2024 | Ganzel | F16D 65/18 |
| 2025/0313181 | A1* | 10/2025 | Hagspiel | B60T 11/10 |

* cited by examiner

BRAKE DEVICE AND VEHICLE EQUIPPED WITH BRAKE DEVICE

CROSS-REFERENCE TO RELATED APPLICATIONS

Pursuant to 35 U.S.C. § 119(a), this application claims the benefit of Korean Patent Application No. 10-2022-0101097, filed on Aug. 12, 2022, which is hereby incorporated by reference as if fully set forth herein.

TECHNICAL FIELD

The present disclosure relates to a brake device connected to a brake disk of a vehicle and the vehicle equipped with the brake device.

BACKGROUND

A brake device mounted on a vehicle is a device for decelerating or stopping the traveling vehicle or maintaining the stopped state of the vehicle, and is a device located inwardly of a rotating wheel and applying a great pressure to a disk-shaped brake disk rotating together with the wheel from both sides using brake pads to brake the vehicle.

In the conventional brake device, the two brake pads disposed on both sides of the disk are supported in a state capable of moving forward and backward on a seating surface inside a caliper body fixed to the vehicle. A pad support pin for guiding the forward and backward movement of the brake pad and a spring member for elastically supporting upper portions of two pad plates to prevent vibration of the pad plate and to ensure a smooth return operation are installed.

The brake device that presses the brake pad in a direction of the brake disk is largely divided into a hydraulic brake scheme and an electromechanical brake (EMB) scheme. The hydraulic type is a traditional brake scheme. When a driver steps on a brake, a force that the driver steps on the brake is immediately transmitted to brake fluid sealed in a master cylinder via a piston of the master cylinder.

This force generates a pressure in the brake fluid in the master cylinder. Based on the Pascal's principle, this pressure is transmitted via a brake pipe to each wheel cylinder and back to a caliper piston. The pressure transmitted to the caliper piston is converted into a compressing force that acts on the brake pad.

When the force is transmitted using the liquid, it is easy to amplify the force. Because the hydraulic brake is operated at a high pressure, a great force may be obtained even when a size of a component of the brake device, for example, a diameter of the wheel cylinder is small.

Unlike the conventional hydraulic brake system, the electro mechanical brake (EMB) is a system that converts the force that the driver steps on the brake pedal into an electrical signal and transmits the electrical signal to an electronic control unit (ECU), and the electronic control unit calculates a vehicle state and a braking force and operates a motor to generate a braking force of an electric caliper.

When the electromechanical brake is applied, the vehicle does not need many of parts of a conventional hydraulic line, such as the master cylinder and a booster, so that the number of braking-related parts is greatly reduced. This simplifies a structure of the brake system, greatly increasing flexibility in vehicle design.

Mounting of the brake system in the vehicle also becomes more free. The driver may install the brake pedal at the most convenient place without having to fix the same at a current position thereof. In a case of further development, the brake pedal may be mounted in a form of a button on a steering wheel.

FIGS. 1 and 2 show a conventional electromechanical brake. A motor M is driven by receiving an electrical signal as shown in FIG. 1, and a force of the motor is transmitted to a bolt screw S that drives a piston P for pressing a brake pad BP seated in a caliper body C in FIG. 2.

As shown in FIGS. 1 and 2, the electromechanical brake may include the bolt screw S for converting a rotational force of the motor M into a linear force, and include a reduction gear G composed of a plurality of gears for transmitting the power of the motor M the bolt screw S and for reducing a speed of the motor when the motor M is placed on one side due to constraints of a space located inwardly of the wheels.

As shown in FIGS. 1 and 2, the electromechanical brake may be constructed in a shape of pressing only a brake pad BP on one side with one piston P. This is because of a size of the bolt screw S, and because the reduction gear G cannot be disposed so as to be exposed in a lateral direction of the vehicle.

In addition, in the case of hydraulic type, the pressures may be transmitted simultaneously to operate the pair of brake pads without errors, but in case of electromechanical type, operation deviation may occur because of the speed of the motor and because the force is transmitted via the plurality of gears. There is also a problem in that a cost increases because four bolt screws, two or more motors, the reduction gear disposed between each bolt screw and the motor, and the like are required.

However, it is difficult to apply the electromechanical brake to heavy vehicles or large passenger vehicles and high-performance vehicles because opposing brakes are required for stable braking and performance.

SUMMARY

Embodiments of the present disclosure are to provide an opposed type brake device having both characteristics of an electro mechanical brake and a hydraulic brake to solve the above problems.

The problems to be solved in the present disclosure are not limited to the technical problems mentioned above, and other technical problems not mentioned may be clearly understood by those skilled in the art to which the present disclosure belongs from the description below.

A brake device for braking by pressing a brake disk according to one aspect of the present disclosure includes a caliper body, a brake pad positioned on a seating surface inside the caliper body, a master cylinder located on a side surface of the caliper body and storing brake fluid therein, a master piston moving linearly in the master cylinder, a braking motor positioned on the side surface of the caliper body and providing a force to drive the master piston, a caliper cylinder located on the seating surface of the caliper body and connected to the master cylinder, and a caliper piston inserted into the caliper cylinder, and, when the braking motor is driven, the master piston pressurizes the brake fluid in the master cylinder and transfers the brake fluid to the caliper cylinder, and the caliper piston protrudes by a pressure of the brake fluid to pressurize the brake pad.

In one implementation, the caliper cylinder may include a plurality of caliper cylinders and the caliper piston may include a plurality of caliper pistons, and the master cylinder may include a first connection portion connected to the plurality of caliper cylinders.

In one implementation, the brake pad may include a first brake pad located on one surface of the brake disk and a second brake pad located on the other surface of the brake disk, the caliper cylinder may include a plurality of caliper cylinders and the caliper piston may include a plurality of caliper pistons so as to be respectively located on the first brake pad and the second brake pad, and the master cylinder may include a first connection portion connected to the plurality of caliper cylinders.

In one implementation, the master piston may be inserted into one end of the master cylinder and a first connection portion connected to the caliper cylinder may be included at an opposite end of the master cylinder, and the brake device may include a first seal cup located on a circumference of the master piston and filling a gap between the master piston and the cylinder.

In one implementation, the brake device may further include a reservoir connected to a second connection portion located on a side surface of the master cylinder and storing the brake fluid therein.

In one implementation, the first seal cup may open a space between the second connection portion and the first connection portion before the master piston is driven, and when the master piston is driven, the second connection portion and the first connection portion may be separated from each other and the brake fluid may be pressurized in a direction of the first connection portion.

In one implementation, the brake device may further include a second seal cup located on the circumference of the master piston and blocking leakage of the brake fluid to the one end of the master cylinder where the master piston is inserted.

In one implementation, the brake device may further include an elastic portion located within the master cylinder and returning the master piston to a position before the driving of the motor when the force of the braking motor is removed.

In one implementation, the brake device may further include a bolt screw for converting a rotational force of the braking motor into a linear motion and providing the linear motion to the master piston.

In one implementation, the brake device may further include a reduction gear located between the bolt screw and the braking motor.

In one implementation, a rotational axis of the braking motor may be disposed in parallel with a rotational axis of the bolt screw, and the braking motor may be located below the master cylinder.

In one implementation, a rotational axis of the braking motor may be disposed perpendicular to a rotational axis of the bolt screw, and the braking motor may be disposed so as not to overlap with the brake pad of the caliper body in a lateral direction, and the brake device may include a bevel gear located between the braking motor and the bolt screw.

In one implementation, the brake device may further include an electronic control unit (ECU) located below the master cylinder.

A vehicle according to another aspect of the present disclosure includes a vehicle body, a plurality of wheels located beneath the vehicle body, rotating, and respectively including brake disks, and a plurality of brake devices respectively disposed in the plurality of wheels, wherein each brake device comes into contact with each brake disk to limit the rotation of each wheel, at least one of the plurality of brake devices includes a caliper body, a pair of brake pads respectively positioned on a pair of seating surfaces within the caliper body so as to face both surfaces of the brake disk, a master cylinder located on a side surface of the caliper body and storing brake fluid therein, a master piston moving linearly in the master cylinder, a braking motor positioned on the side surface of the caliper body and providing a force to drive the master piston, a plurality of caliper cylinders located on the pair of seating surfaces of the caliper body and connected to the master cylinder, and a plurality of caliper pistons respectively inserted into the plurality of caliper cylinders, and when the braking motor is driven, the master piston pressurizes the brake fluid in the master cylinder and transfers the brake fluid to the plurality of caliper cylinders, and the caliper piston protrudes by a pressure of the brake fluid to pressurize the brake pad.

According to one of the embodiments of the present disclosure, the hybrid brake device having both the advantages of the conventional hydraulic brake and the electromechanical brake may be provided.

As the complicated flow channel is not required as in the conventional hydraulic brake, the braking-related parts may be greatly reduced and the structure of the brake system may become simplified, greatly increasing the flexibility in the vehicle design.

Even when the number of caliper pistons that pressurize the brake pad is increased, there is no need to increase the numbers of motors, gears, and bolt screws, and the operation deviation between the caliper pistons does not occur, so that the opposed type brake device capable of braking the vehicle with the high weight may be provided.

In addition, because the size of the parts may be reduced compared to the conventional electromechanical brake, the light-weight and miniaturized design may be achieved, so that the space for mounting other components such as the electronic control unit may be additionally secured.

Effects obtainable from the present disclosure are not limited to the effects mentioned above, and other effects not mentioned may be clearly understood by those skilled in the art from the description below.

DETAILED DESCRIPTION

Figure 1:
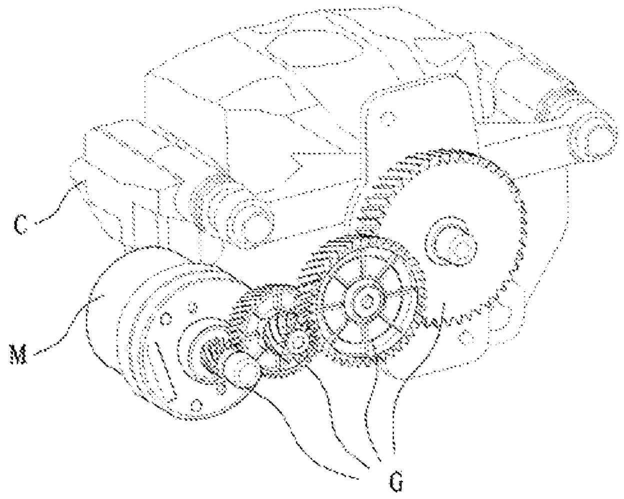
FIG. 1 is a perspective view showing a conventional electromechanical brake.

Advantages and features of the present disclosure, and a method for achieving the same, will become apparent with reference to the embodiments described below in detail in conjunction with the accompanying drawings. However, the present disclosure may not be limited to the embodiments disclosed below, but may be implemented in a variety of different forms. The present embodiments are provided only to ensure that the disclosure of the present disclosure is complete, and to completely inform those skilled in the art to which the present disclosure belongs, the scope of the present disclosure. The present disclosure is only defined by the scope of the claims.

The terminology used herein is for the purpose of describing the embodiments only and is not intended to limit the present disclosure. As used herein, the singular forms "a" and "an" are intended to include the plural forms as well, unless the context clearly indicates otherwise. As used herein, "comprises" and/or "comprising" do not exclude the presence or addition of one or more other components in addition to a stated component. Like reference numerals refer to like components throughout the specification, and "and/or" includes each of the mentioned components and every combination of one or more of the components. Although "first", "second", and the like are used to describe various components, it is apparent that such components are not limited by such terms. Such terms are only used to distinguish one component from another. Accordingly, it is apparent that the first component mentioned below may be the second component within the technical spirit of the present disclosure.

Unless otherwise defined, all terms including technical and scientific terms used herein have the same meaning as commonly understood by one of ordinary skill in the art to which the present disclosure belongs. In addition, terms defined in a commonly used dictionary are not to be interpreted ideally or excessively unless specifically defined explicitly.

Spatially relative terms "below", "beneath", "lower", "above", "upper", and the like may be used to easily describe a correlation between one component and other components as shown in the drawings. Spatially relative terms should be understood as terms including different directions of the components during use or operation in addition to directions shown in the drawings. For example, when a component shown in the drawings is flipped, a component described as being located "below" or "beneath" another component may be placed "above" said another component. Accordingly, the exemplary term "below" may include both downward direction and upward direction. Components may also be oriented in other directions, and thus, spatially relative terms may be interpreted based on the orientation.

Figure 3:
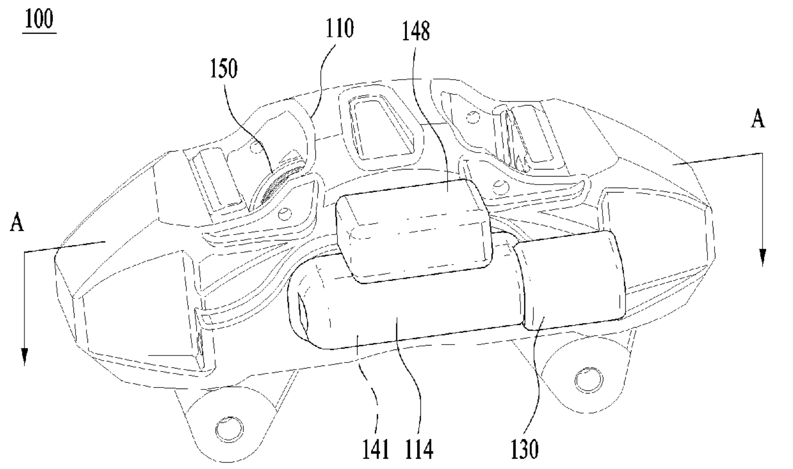
FIG. 3 is a perspective view of a brake device according to one of embodiments of the present disclosure.
Figure 3:
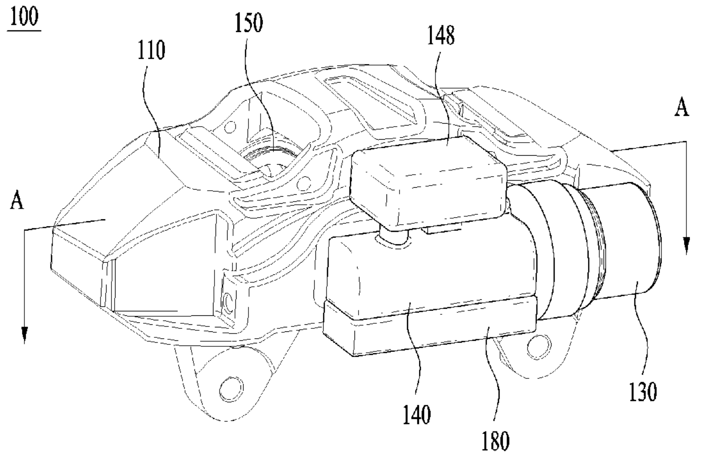
Figure 4:
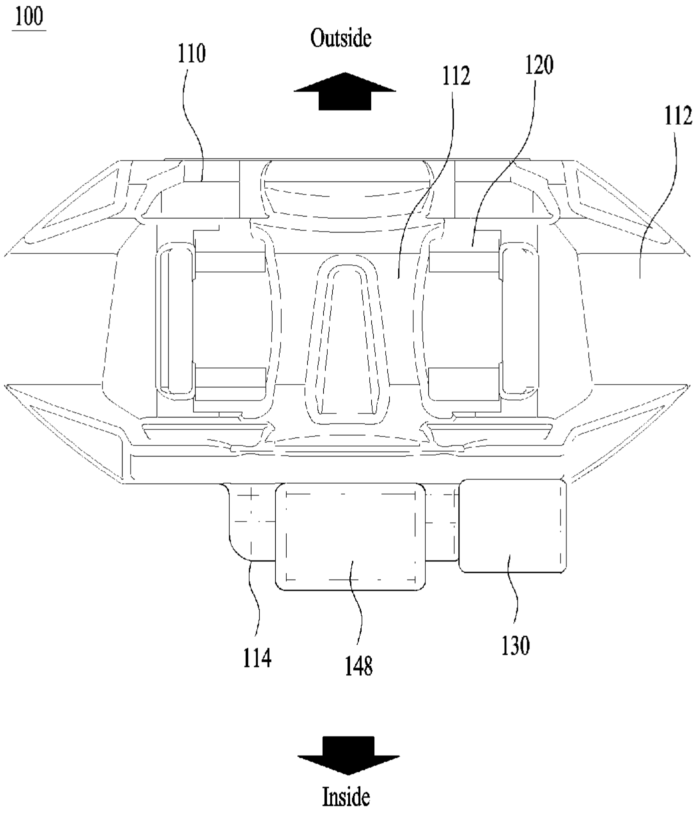
FIG. 4 is a plan view of a brake device according to one of embodiments of the present disclosure.

FIG. 3 is a perspective view of a brake device 100 according to one of embodiments of the present disclosure. FIG. 4 is a plan view of the brake device 100 according to one of embodiments of the present disclosure.

The brake device 100 according to the present disclosure includes a caliper body 110, a brake pad 120, a master cylinder 141, a master piston 142, a braking motor 130, a caliper cylinder 152, and a caliper piston 150.

The caliper body 110 includes a seating surface 111 inserted into one end of the brake pad 120 and facing both surfaces of the brake pad 120 therein. A connection portion 112 that surrounds a side surface of the brake pad 120 or extends through an inner side of a ring-shaped brake disk to connect a pair of seating surfaces 111 to each other may be included. The present embodiment includes the connection portion 112 located on an outer circumference of a brake disk 200.

The braking motor 130, the master piston 142, and the master cylinder 141 located at a side of the caliper body 110 may be included, and those may be located on a side inwardly of wheels so as not to be exposed to the outside of a vehicle.

The caliper body 110 may include an accommodating portion 114 for accommodating therein parts such as the master cylinder 141, the master piston 142, and a bolt screw 135. Because the parts such as the master cylinder 141, the master piston 142, and the bolt screw 135 may be contaminated when exposed to the outside, parts exposed to the outside may be minimized by defining the space 114 in the caliper body 110.

Figure 5:
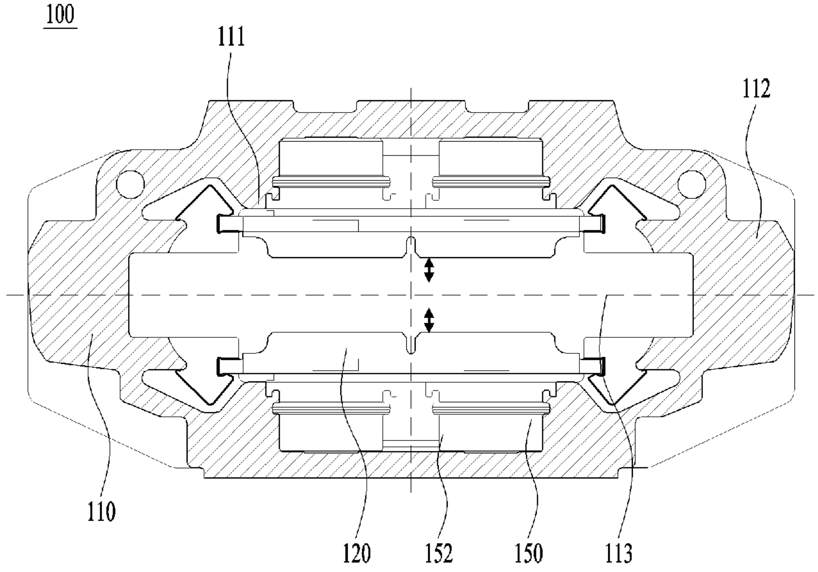
FIG. 5 is a cross-sectional view of FIG. 3 taken along a line A-A.
Figure 6:
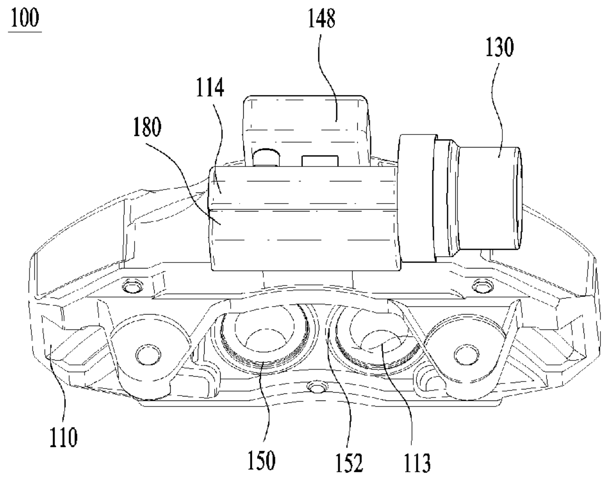
FIG. 6 is a diagram showing a seating surface of a brake pad of a brake device according to one of embodiments of the present disclosure.

FIG. 5 is a cross-sectional view of FIG. 3 taken along a line A-A. FIG. 6 is a diagram showing the seating surface 111 of the brake pad 120 of the brake device 100 according to one of embodiments of the present disclosure.

Referring to FIG. 5, the brake disk 200 may be positioned between the pair of seating surfaces 111 of the caliper body 110, and the brake pad 120 may be disposed on the seating surface 111 so as to face the brake disk 200.

Figure 2:
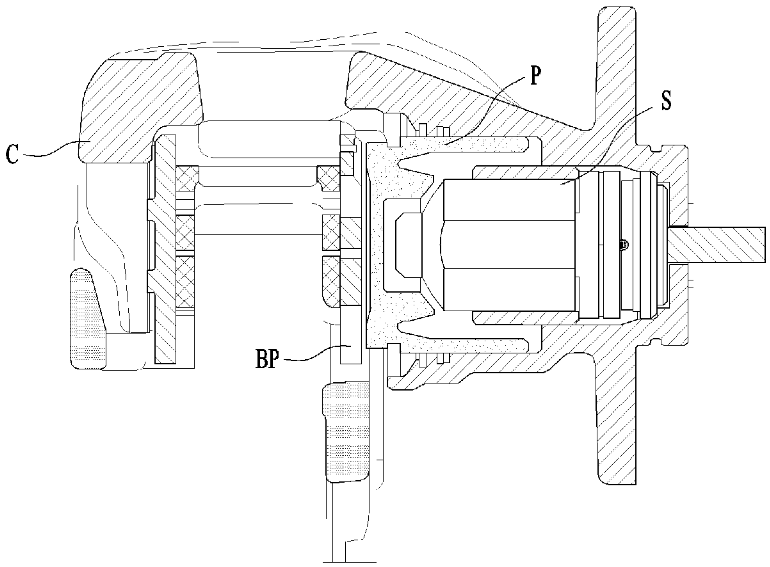
FIG. 2 is a cross-sectional view showing a conventional electromechanical brake.

The brake device 100 in the embodiment of FIG. 2 is a device that brakes rotation of the brake disk 200 by pressing only the brake pad 120 on one side among the pair of brake pads 120. As the brake pad 120 on one side presses the brake disk 200, the brake disk 200 also moves within a certain range.

As such, in the form in which only one brake pad 120 moves, stability of the brake disk 200 is low and the brake disk 200 is not able to be pressed from both sides with a uniform force, so that great friction occurs at a specific point of the brake pad 120, resulting in severe wear. In addition, there is a problem that a braking force is reduced and a replacement cycle of the brake pad 120 is shortened.

To solve the above problem, in the present disclosure, as shown in FIG. 5, the caliper pistons 150 may be respectively positioned on the pair of seating surfaces 111 so as to press both brake pads 120 on the both sides.

In particular, a force applied to the brake pad 120 may be stably distributed by arranging a plurality of caliper pistons 150 for each brake pad 120. The present embodiment may include four caliper pistons 150, and as shown in FIG. 6, a pair of caliper pistons 150 may be located on the seating surface 111 and the caliper piston 150 may be inserted into a caliper cylinder 152 formed in the caliper body 110.

For accurate braking, the brake device 100 that may provide the uniform force to the four caliper pistons 150 without operating errors is required. However, in the case of the electromechanical brake, operation deviation may occur because of a speed of the motor and because the force is transmitted via a plurality of gears. Four bolt screws 135, two or more braking motors 130, a reduction gear 133 disposed between each bolt screw 135 and the braking motor 130, and the like are required, which increases a cost.

Accordingly, the present disclosure includes the master cylinder 141 in which brake fluid is accommodated and the master piston 142, but the brake fluid is not compressed by a pedal effect of the driver as in a conventional hydraulic brake device, but is compressed by driving of the braking motor 130.

Figure 7:
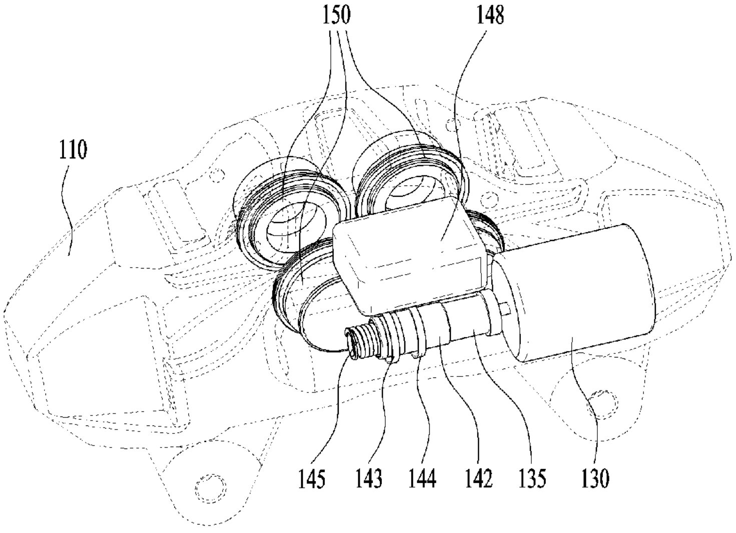
FIG. 7 is a conceptual diagram of a brake device according to one of embodiments of the present disclosure.

FIG. 7 is a conceptual diagram of the brake device 100 according to one of embodiments of the present disclosure. FIG. 7 is a perspective view in an outward direction of the vehicle.

FIG. 7 shows the components of the caliper piston 150, the master piston 142, the bolt screw 135, and the like of the brake device 100, which are located on the inner side of the caliper body 110 and accommodated in the accommodating portion 114 and thus not shown in FIG. 3.

The master cylinder 141, the master piston 142, the bolt screw 135, and seal caps 143 and 144 may be located in the accommodating portion 114 of the caliper body 110, and a reservoir 148 connected to the master cylinder 141 and storing the brake fluid may be included.

As described above, components coupled to a side portion of the caliper body 110, such as the braking motor 130, the master cylinder 141, and the master piston 142, may be located on a side surface facing an inner side of the vehicle.

Figure 8:
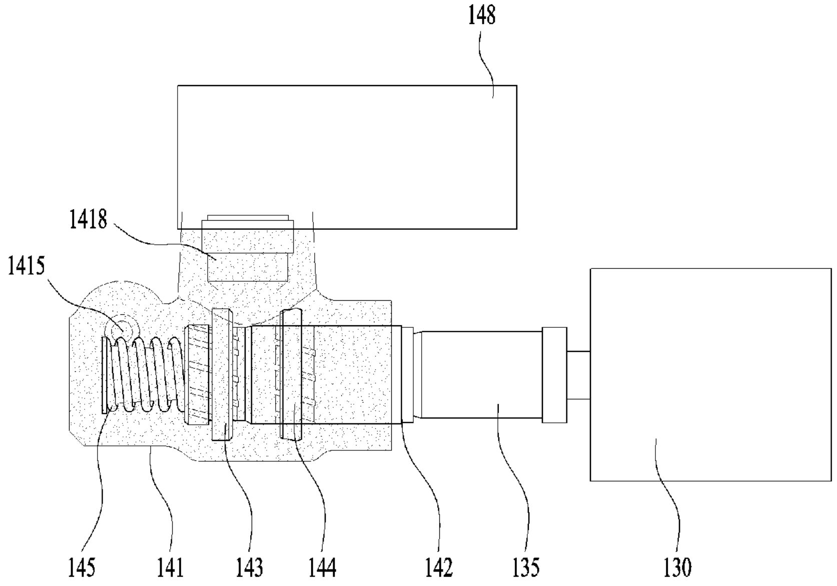
FIG. 8 is a side view showing a motor, a bolt screw, a master cylinder, a master piston, and a reservoir of a brake device according to one of embodiments of the present disclosure.

FIG. 8 is a side view showing a configuration of the brake device 100 in FIG. 7 in more detail. Referring to FIG. 8, the braking motor 130, the bolt screw 135, the master cylinder 141, the master piston 142, and the reservoir 148 are illustrated.

The braking motor 130 may be driven when an electrical signal including a braking command is applied from an electric control unit (ECU) 180. The braking motor 130 may provide a rotational force and may include the bolt screw 135 to convert the rotational force of the braking motor 130 into a linear motion.

The bolt screw 135 includes a bar-shaped screw in which a spiral groove is defined, and a bolt inserted into the screw, and the bolt does not rotate like the screw and is coupled to a rail on which only a linear motion is possible.

When the screw rotates, the bolt cannot rotate and thus moves in a straight line while moving along the spiral groove of the screw. The bolt of the bolt screw 135 may move in a horizontal direction on the drawing. A length of the bolt screw 135 is varied by the driving of the braking motor 130.

The bolt screw 135 requires a predetermined length because of the spiral screw, and the bolt screw 135 may press the master piston 142 while moving to the left.

In the conventional electromechanical brake, the bolt screw 135 pressurizes the caliper piston 150 that directly presses the brake pad 120. However, in this case, because the plurality of pistons cannot be operated without the operating errors, the present disclosure transmits a pressure by the linear motion of the bolt screw 135 to the plurality of caliper pistons 150 using the master piston 142 and the master cylinder 141.

The master cylinder 141 is a cylindrical member into which the brake fluid is injected. The cylindrical master piston 142 is inserted into one side 1412 of the master cylinder 141, and the master cylinder 141 includes a first connection portion on an opposite side thereof. A first connection portion 1415 may be connected to the caliper cylinder 152 into which the caliper piston 150 is inserted, and the brake fluid in the master cylinder 141 may flow to the caliper cylinder 152 via the first connection portion 1415 to pressurize the caliper piston 150.

The first seal cup 143 and the second seal cup 144 located on a circumference of the master piston 142 may be included. The first seal cup 143 serves to fill a gap between the master cylinder 141 and the master piston 142 such that the brake fluid may flow to the caliper cylinder 152 via the first connection portion 1415 when the master piston 142 is pressurized.

A second connection portion 1418 connected to the reservoir 148 for storing the brake fluid is located adjacent to the first seal cup 143. Before the master piston 142 is pressurized, a space between the first connection portion 1415 and the second connection portion 1418 is opened and the brake fluid is filled in the master cylinder 141.

When the master piston 142 is pressurized, the first seal cup 143 may shield the space between the second connection portion 1418 and the first connection portion 1415, and the pressure of the master piston 142 may be transmitted in a direction of the connection portion 1415 without being distributed toward the reservoir 148.

The conventional hydraulic brake requires a large capacity of brake fluid because the brake fluid is transmitted from a brake pedal to brakes of four wheels, but the hydraulic structure of the present disclosure is independent for each wheel and thus is small in size. Therefore, a capacity of about 100 cc is also sufficient for the reservoir 148 that stores the brake fluid therein.

The first connection portion 1415 connected to the reservoir 148 may be located on an upper side when the master cylinder 141 is placed on the caliper such that the brake fluid of the reservoir 148 may be naturally filled into the master cylinder 141.

In one example, the second seal cup 144 located on one side of the master cylinder 141, that is, on the side where the master piston 142 is inserted serves to prevent the brake fluid from leaking into the opening into which the master piston 142 is inserted.

The first seal cup 143 and the second seal cup 144 protrude from an outer circumferential surface of the master piston 142 and may come into close contact with an inner surface of the master cylinder 141. Airtightness may be maintained using an elastic material such as urethane or silicone.

An elastic portion 145 located at an end of the master piston may be further added such that the master piston 142 returns to an original position thereof when the driver releases the brake pedal, the driving of the braking motor 130 is stopped, and the force for pressing the master piston 142 disappears.

Figure 9:
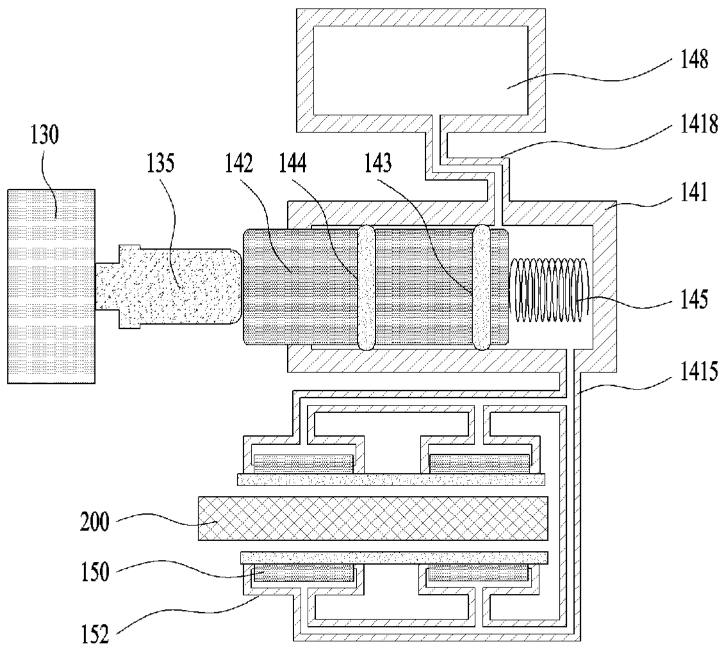
FIGS. 9 and 10 are conceptual diagrams of a brake device according to one of embodiments of the present disclosure.
Figure 10:
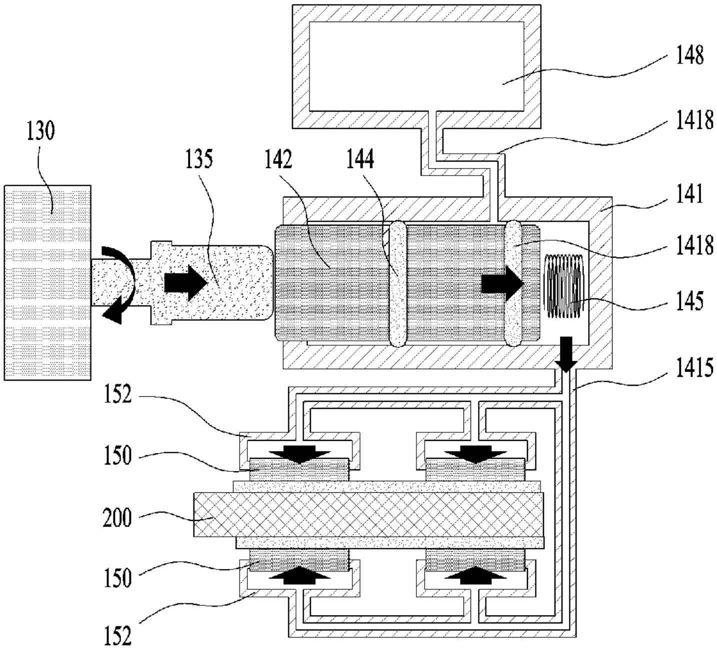

FIGS. 9 and 10 are schematic diagrams of the brake device 100 according to the present disclosure. FIG. 9 shows a state during traveling and FIG. 10 shows a state during braking. As shown in FIG. 9, the first connection portion 1415 of the master cylinder 141 is connected to each caliper cylinder 152.

The caliper piston 150 located in the caliper cylinder 152 is located on an opposite side of a friction surface of the brake pad 120. The caliper piston 150 is in a state of being spaced apart from the brake pad 120 and the brake disk 200, and the brake disk 200 is able to rotate together with the wheel.

As shown in FIG. 10, when a braking signal is applied to the braking motor 130, the braking motor 130 rotates the bolt screw 135 while rotating, and the bolt screw 135 pressurizes the master piston 142 to transfer the brake fluid in the master cylinder 141 to the caliper cylinder 152, so that the caliper piston 150 protrudes from the seating surface 111 of the caliper.

The caliper piston 150 performs the braking by pushing the brake pad 120 such that the brake pad 120 comes into contact with the brake disk 200. As the brake fluid supplied from the master cylinder 141 is evenly distributed to the plurality of caliper cylinders 152, the plurality of caliper pistons 150 may pressurize the brake pad 120 with the uniform force, so that the stable braking may be performed.

The hybrid type brake device 100 according to the present disclosure may implement an opposed type brake, and thus, have an excellent braking performance, so that it may be applied to heavy vehicles or high-performance vehicles. In addition, a plurality of braking motors 130 or bolt screws 135 for driving the plurality of caliper pistons 150 are not required, so that a volume of the brake device 100 is small.

A flow channel arrangement is free in the first connection portion 1415 that connects the master cylinder 141 and the caliper cylinder 152 to each other, so that arrangement of components such as the master cylinder 141 and the braking motor 130 is free, which improves a degree of freedom of design when designing the vehicle.

Figure 11:
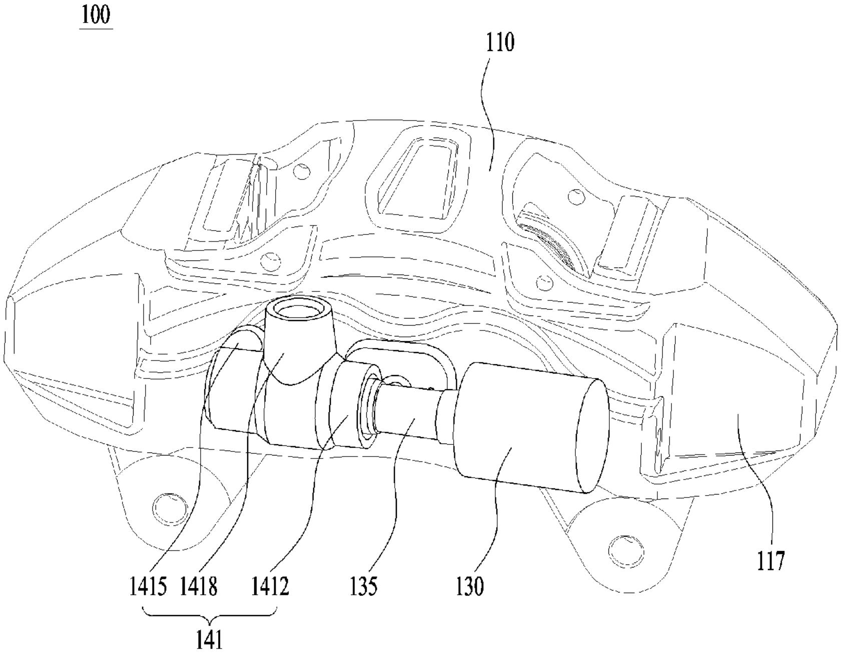
FIGS. 11 to 13 are perspective views showing various embodiments of a brake device of the present disclosure.
Figure 12:
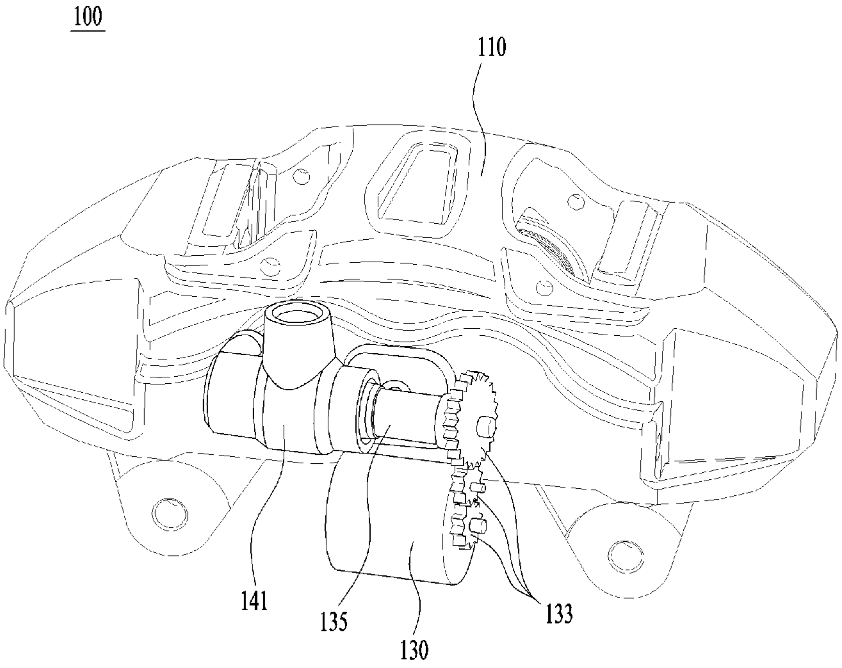
Figure 13:
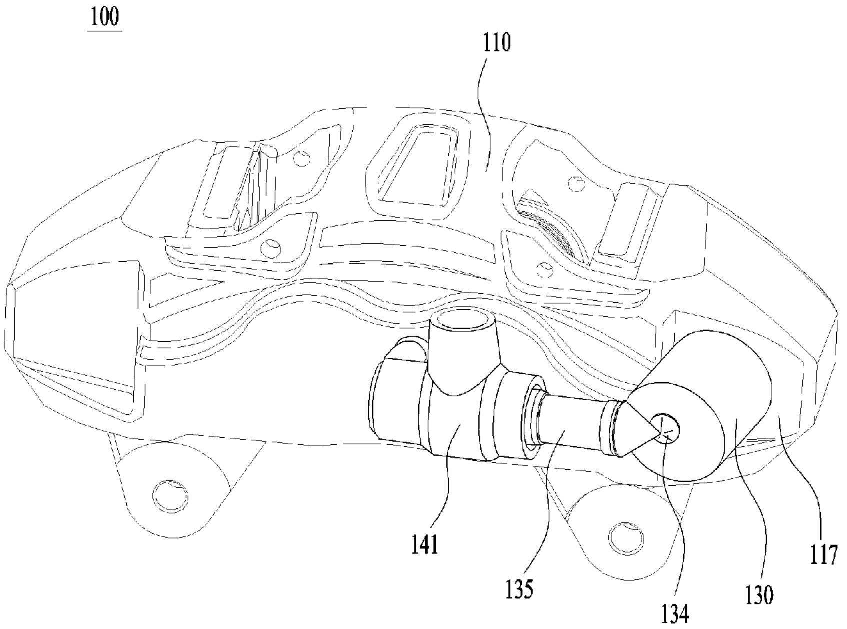

FIGS. 11 to 13 are perspective views showing various embodiments of the brake device 100 according to the present disclosure. As shown in FIGS. 11 to 13, arrangement of the braking motor 130 and the bolt screw 135 may be variously changed. Accordingly, positions of the parts of the brake device 100 disposed at the side of the caliper body 110 may also be freely designed.

As shown in FIG. 11, the bolt screw 135 and the braking motor 130 may be arranged in a straight line. Because there is sufficient space under the master cylinder 141, as shown in FIG. 6, the electronic control unit 180 may be disposed below the accommodating portion 114 in which the master cylinder 141 or the like is mounted.

However, as shown in FIG. 11, the larger the diameter of the braking motor 130, the greater the power. However, when the bolt screw 135 and the braking motor 130 are arranged in the straight line, it is difficult to increase the diameter of the braking motor 130. At a right side of FIG. 11, because the caliper body 110 is recessed at a position 117 not overlapping the brake pad 120, the master cylinder 141, the bolt screw 135, and the motor 130 may be moved to the right on the drawing and placed.

To be a little more free from size constraints of the braking motor 130, as shown in FIG. 12, the braking motor 130 may be disposed below the bolt screw 135. A rotational axis of the bolt screw 135 and a rotational axis of the braking motor 130 may be arranged in parallel with each other, but a plurality of gears may be arranged to transmit the rotational force of the motor 130.

The power of the motor 130 may be amplified via the reduction gear 133 that reduces the number of revolutions of the bolt screw 135 compared to the number of revolutions of the motor 130 by adjusting the number of teeth of the plurality of gears. That is, the reduction gear 133 may adjust a gear ratio by coupling, to the bolt screw 1135, a gear with a larger number of teeth compared to the number of teeth of a gear coupled to the braking motor 130.

With such arrangement, the size of the braking motor 130 may be further increased by placing the braking motor 130 at a position not overlapping the caliper cylinder 152 and the brake pad 120.

Alternatively, as shown in FIG. 13, the braking motor 130 and the bolt screw 135 may be disposed so as not to be in parallel with each other using a conical bevel gear 134. Although teeth are shown as being omitted on an outer side of the bevel gear 134 in the drawing, the teeth may be formed on a conical surface, and the two components may be arranged at 90 degrees. In such arrangement, to secure a mounting space for the braking motor 130, as shown in FIG. 13, the braking motor 130 may be disposed in the concave portion 117 of the caliper described above.

As described above, according to one of the embodiments of the present disclosure, the hybrid brake device 100 having both advantages of the conventional hydraulic brake and the electromechanical brake may be provided.

As a complicated flow channel is not required as in the conventional hydraulic brake, braking-related parts may be greatly reduced and a structure of the brake system may become simplified, greatly increasing the flexibility in the vehicle design.

Even when the number of caliper pistons 150 that pressurize the brake pad 120 is increased, there is no need to increase the numbers of motors 130, gears, and bolt screws 135, and the operation deviation between the caliper pistons 150 does not occur, so that the opposed type brake device 100 capable of braking the vehicle with the high weight may be provided.

In addition, because the size of the parts may be reduced compared to the conventional electromechanical brake, a light-weight and miniaturized design may be achieved, so that the space for mounting other components such as the electronic control unit may be additionally secured.

The detailed descriptions of the preferred embodiments of the present disclosure disclosed as described above have been provided to enable those skilled in the art to implement and practice the present disclosure. Although described above with reference to the preferred embodiments of the present disclosure, those skilled in the art will be able to understand that the present disclosure may be variously modified and changed without departing from the scope of the present disclosure. For example, those skilled in the art may use the components described in the above-described embodiments in a manner of combining the components with each other.

Accordingly, the present disclosure is not intended to be limited to the embodiments described herein, but is to be accorded the widest scope consistent with the principles and novel features disclosed herein.

What is claimed is:

1. A brake device for braking by pressing a brake disk, the brake device comprising:
- a caliper body including an accommodating portion located on a side surface of the caliper body;
- a plurality of brake pads positioned on a seating surface inside the caliper body;
- a master cylinder located in the accommodating portion and storing brake fluid therein;
- a reservoir located above the accommodating portion and operable to supply the brake fluid to the master cylinder;
- a master piston located in the accommodating portion and extending into the master cylinder, the master piston being movable linearly in the master cylinder;
- a braking motor positioned on the side surface of the caliper body and operative to generate a rotational force in response to receiving an electrical signal;
- an electronic control unit (ECU) mounted below the accommodating portion opposite from the reservoir and configured to generate the electrical signal;
- a bolt screw operably coupled between the master piston and the braking motor and configured to convert the rotational force into a linear motion to drive the master piston, the bolt screw being located within the accommodating portion;
- a plurality of caliper cylinders located on the seating surface of the caliper body for each of the brake pads, each caliper cylinder being connected to the master cylinder;
- a caliper piston within each of the caliper cylinders; and a first connection portion extending from the master cylinder and connected to each of the caliper cylinders in parallel, wherein, when the braking motor is operated, the master piston is driven to pressurize the brake fluid in the master cylinder and transfer the brake fluid to each of the caliper cylinders through the first connection portion to cause the caliper pistons to protrude, by a pressure imparted by the brake fluid, to apply pressure to the brake pad, and wherein the master cylinder is arranged such that, when the master piston is driven to pressurize the brake fluid in the master cylinder, the master piston is moved in a direction that is perpendicular to a direction of movement of the caliper piston.

2. The brake device of claim 1, wherein the brake pads include a first brake pad located on one surface of the brake disk and a second brake pad located on another surface of the brake disk, and wherein the caliper cylinders includes caliper cylinders arranged facing both the first brake pad and the second brake pad.

3. The brake device of claim 1, wherein the master piston is located within one end of the master cylinder, and a first connection portion connected to the caliper cylinder is included at an opposite end of the master cylinder, wherein the brake device includes a first seal cup located on a circumferential surface of the master piston, within a gap between the master piston and the cylinder.

4. The brake device of claim 3, wherein the reservoir is connected to a second connection portion located on an upper surface of the master cylinder.

5. The brake device of claim 4, wherein the first seal cup is arranged to open a space between the second connection portion and the first connection portion before the master piston is driven, wherein, when the master piston is driven, the second connection portion and the first connection portion are separated from each other and the brake fluid is pressurized in a direction of the first connection portion.

6. The brake device of claim 3, further comprising:

a second seal cup located on the circumferential surface of the master piston and blocking leakage of the brake fluid to the one end of the master cylinder where the master piston is inserted.

7. The brake device of claim 1, further comprising:

an elastic portion located within the master cylinder and returning the master piston to its position before the operation of the motor when the force of the braking motor is removed.

8. The brake device of claim 1, further comprising:

a reduction gear located between the bolt screw and the braking motor.

9. The brake device of claim 1, wherein a rotational axis of the braking motor is disposed in parallel with a rotational axis of the bolt screw, and the braking motor is located below the master cylinder.

10. The brake device of claim 1, wherein a rotational axis of the braking motor is disposed perpendicular to a rotational axis of the bolt screw, and the braking motor is disposed so as not to overlap with the brake pad of the caliper body in a lateral direction, wherein the brake device includes a bevel gear located between the braking motor and the bolt screw.

11. A vehicle comprising:

a vehicle body;

a plurality of wheels located beneath the vehicle body, rotatable, and including respective brake disks; and a plurality of brake devices disposed respectively at the plurality of wheels, wherein each brake device is operative to come into contact with each brake disk to limit rotation of each wheel, wherein at least one of the plurality of brake devices includes:

a caliper body including an accommodating portion located on a side surface of the caliper body;

a pair of brake pads respectively positioned on a pair of seating surfaces within the caliper body so as to face both surfaces of the brake disk;

a master cylinder located in the accommodating portion and storing brake fluid therein;

a reservoir located above the master cylinder and operable to supply the brake fluid to the master cylinder;

a master piston located in the accommodating portion and extending into the master cylinder, the master piston being movable linearly in the master cylinder;

a braking motor positioned on the side surface of the caliper body and operative to generate a rotational force in response to receiving an electrical signal;

an electronic control unit (ECU) mounted below the accommodating portion opposite from the reservoir and configured to generate the electrical signal;

a bolt screw operably coupled between the master piston and to the braking motor and configured to convert the rotational force into a linear motion to drive the master piston, the bolt screw being located within the accommodating portion;

a plurality of caliper cylinders located on the pair of seating surfaces of the caliper body and connected to the master cylinder;

a plurality of caliper pistons inserted respectively into the plurality of caliper cylinders; and a first connection portion extending from the master cylinder and connected to each of the caliper cylinders in parallel, wherein, when the braking motor is operated, the master piston is operative to pressurize the brake fluid in the master cylinder and transfer the brake fluid to the plurality of caliper cylinders through the first connection portion, and the plurality of caliper pistons is operative to protrude, by a pressure from the brake fluid, to press the pair of brake pads, and wherein the master cylinder is arranged such that, when the master piston is driven to pressurize the brake fluid in the master cylinder, the master piston is moved in a direction that is perpendicular to a direction of movement of the caliper pistons.

* * * * *